C. J. PERKINS.
MOLD FOR MANUFACTURING PLASTIC BLOCKS.
APPLICATION FILED JAN. 20, 1919.
1,315,984.  Patented Sept. 16, 1919.
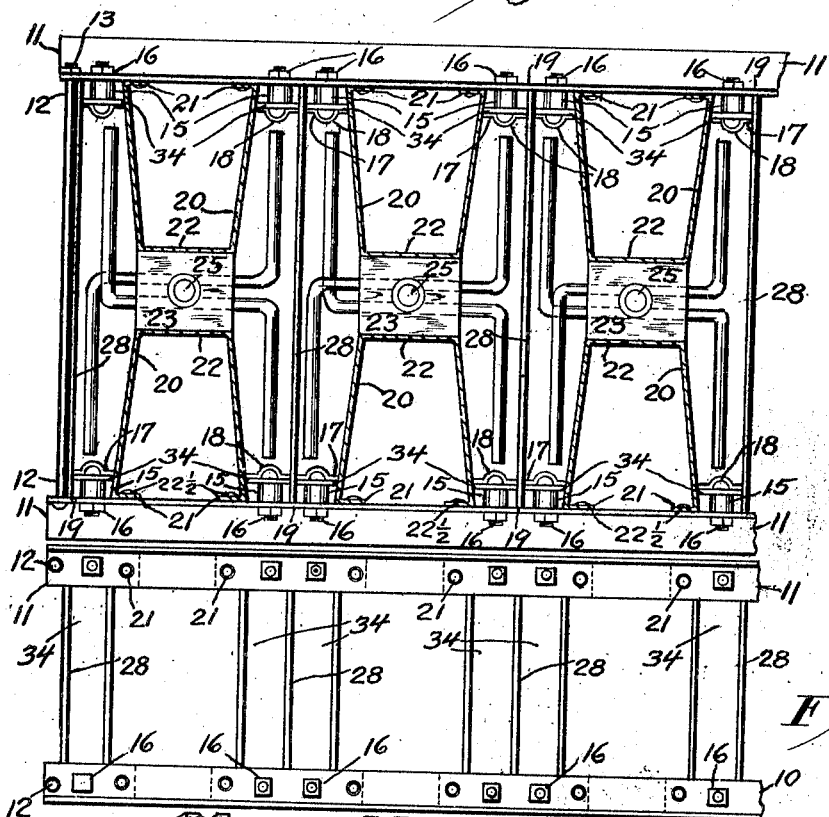
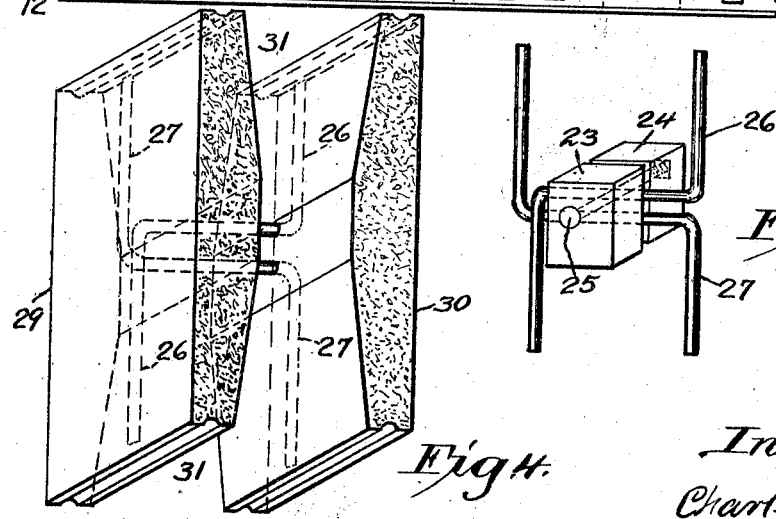
Inventor:
Charles J. Perkins.
Witnesses:

UNITED STATES PATENT OFFICE.

CHARLES J. PERKINS, OF CHICAGO, ILLINOIS.

MOLD FOR MANUFACTURING PLASTIC BLOCKS.

1,315,984. Specification of Letters Patent. Patented Sept. 16, 1919.

Application filed January 20, 1919. Serial No. 272,064.

*To all whom it may concern:*

Be it known that I, CHARLES J. PERKINS, a citizen of the United States, and a resident of Chicago, in the county of Cook and State of Illinois, have invented a certain new and useful Mold for Manufacturing Plastic Blocks, of which the following is a specification.

The object of my invention is to provide a mold of simple, durable, and inexpensive construction for making plastic blocks.

More particularly it is my object to provide a mold particularly adapted to making plastic blocks, (preferably of cement concrete), with the entire space between the inner sides of the block practically hollow, and adapted for use in wall construction for houses, barns, bridge abutments, and general wall construction.

A further object is to provide a mold that will permit one of its walls much thicker than the opposing wall of the block, by increasing the width of two of the opposing upright end members.

A further object is to provide a mold with upright ends of the mold members, beveled, so that the plastic block can be better sealed at the ends by placing cement mortar in such beveled recesses, for concavities.

A further object of my invention is to provide the means of placing steel reinforcing rods connecting each wall of the block at the center and thickest part of the block.

Another object of my mold invention is to provide the means of placing lateral steel reinforcing rods in the hollow space of the wall, to comply with the various directions of architects and engineers, and after placing the steel reinforcing rods therein, fill the hollow space of the blocks with concrete grout.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top, or plan, view of a mold embodying my invention.

Fig. 2 shows a side view of the mold, Fig. 1.

Fig. 3 shows the means of placing and holding steel reinforcing rods in the mold, preparatory to filling the mold with plastic material.

Fig. 4 shows a perspective view of one of the plastic blocks with the manner of placing the steel reinforcing rods therein.

My mold is designed for making plastic building blocks to stand on their longitudinal edges and staggered, as practised in wall construction.

The mold may be of many sections, but in practice, ten sections constitutes a mold, this producing ten plastic blocks at each operation.

The mold may be placed on any flat surface for casting the product.

My mold consists of lower horizontal angle irons 10 forming lower frame members, spaced from each other; also upper horizontal angle irons 11 forming upper frame members similarly spaced from each other and extending above and spaced from angle irons 10.

The respective angle irons 10 on each side of the mold are secured together by rods 12 extending through suitable notches, or holes in the flanges of the angle irons 10, and the respective angle irons 11, on each side of the mold are secured together by similar rods 12, arranged in similar notches, or holes. These rods 12, are threaded at one end to receive nuts 13.

The side walls of my improved mold consist of transverse metal partitions 28.

There is secured to the angle irons above mentioned a series of spacing sleeves 15, by threaded bolts and nuts 16, passing through the angle iron flanges into and through the spacing sleeves 15, and thence through the ends of the beveled metal upright members 34; these members consist of a flat metal sheet 34, and secured to each sheet 34, is a similar flat metal sheet 17, forming end mold members having a central inwardly extending rib 18.

These end mold members 34, extend from top to bottom of the inside of the mold Fig. 1.

The upright member sheets 34, with the inwardly extending rib 18, may be dispensed with by using heavier flat metal sheets.

The upright members 34 on each side of the mold are spaced from each other slightly horizontally to receive the ends of the metal transverse partition sheets 28 as shown in Fig. 1 at 19.

The members 20 are core boxes formed of sheet metal; the outer end 21 being wider than the inner end 22, and fastened to the flange of the upper and lower angle irons or bars by rivets 22½.

The object of making the core boxes 20 wider at the outer end is to permit these core boxes to be withdrawn easily, after the mold is filled, and the plastic material has hardened.

The member Fig. 3, consists of two wooden blocks 23 and 24, bolted together at 25 to receive the center portions of the reinforcing rods 26 and 27, and hold them temporarily in place the rod holder 23 and 24, and the bolt 25, is placed in the mold between the inner ends of the core boxes 20, before filling the mold.

The members 23 and 24, and the bolt 25 are removed from the mold after filling the mold and the material has hardened.

The operation of the mold consists in placing the respective ends of the mold in erect position; placing the rods 12 into the respective angle iron notches or holes in the respective flanges and tighten to the required width of the mold; placing the ends of the transverse partition sheets 28 into the spaces formed by the upright end members 34 and the spacing sleeves 15; after which, the reinforcing rod holder 23 and 24 and bolt 25 shown in Fig. 3, with suitable steel reinforcing rods 26 and 27 in place therein, is inserted in the mold between the inner ends of the core boxes 20.

The completed block indicated by the reference shown in Fig. 4, has two flat outside faces 29 and 30, and a hollow space throughout the center of the block 31, with each wall of the block held firmly in place by the reinforcing rods 26 and 27, and which are thoroughly embedded in the concrete grout forming each wall.

It will be readily observed that my arrangement of the mold is a great improvement in mold construction for producing a concrete, or plastic unit to form a positive hollow wall, that will prevent moisture, dampness, or cold from penetrating from the outside of the wall to the inner side of the wall.

My mold has comparatively small number of parts and may be quickly set up or taken down, for manufacturing blocks, or shipping the mold in a small space by withdrawing the rods, 12.

Some changes may be made in the construction and arrangement of the parts of my improved mold, without departing from the essential features and purposes thereof, and it is my intention to cover by my present claims any modified forms of structure or use of mechanical equivalents which may be included within their reasonable scope.

I claim as my invention:—

1. In the mold, spaced upper and lower members, means of connecting said frame members together, spacing sleeve members, detachably connected with the upper and lower frame members supported by the sleeves; angular shaped core boxes, attached to the upper and lower frame members; detached reinforcing rod holder members; detachable transverse partition members.

2. In a mold, spaced frame members, pairs of spacing sleeves, vertically spaced on the upper and lower frame member ends supported by the sleeves and attached thereto, and placed on opposite sides of the mold, the upright end members on each side of the mold being spaced from each other by use of the spacing sleeves; such spaces to receive the ends of the wall members.

3. In a mold, spaced horizontal lower frame members, spaced horizontal upper frame members, each forming the sides of the mold; upright end members attached to the said upper horizontal and lower horizontal frame members by bolts passing through spacing sleeves; the respective spacing sleeves being spaced sufficiently wide to receive the partition members by insertion of their ends in said spaces; sheet metal wall members; angularly shaped core boxes, attached at their outer ends to the upper and lower frame members; detachable reinforcing rod holders.

4. In a mold, spaced horizontal lower frame members, spaced parallel horizontal upper frame members, spacing sleeves mounted on said upper and lower frame members, arranged in horizontal opposite pairs and in vertical opposite pairs, the spacing sleeves of the respective frame being successively, horizontally spaced from each other, said mold members connecting the respective vertical spacing sleeves by bolts to the upright end members of said mold; detachable transverse metal partition members forming the walls of said mold; angular core boxes attached to the respective frame members; detached reinforcing rod holders.

5. In a mold, spaced horizontal lower frame members, spaced parallel horizontal upper frame members; spacing sleeves mounted on said frame members arranged in horizontal opposite pairs and in vertical opposite pairs, the spacing sleeves of the respective upright frame members being successively, horizontally spaced from each other; said upright frame mold members connecting the respective pairs of spacing sleeves; detachable transverse metal sheet members mounted between the horizontally spaced spacing sleeves; angular core box members attached at top and bottom of the upper and lower frame members, detached reinforcing rod holder members.

Des Moines, Iowa, January 15th 1919.

CHARLES J. PERKINS.

Witnesses:
A. T. CONAWAY,
M. GITTINS.

Copies of this patent may be obtained for five cents each, by addressing the "Commissioner of Patents, Washington, D. C."